(12) United States Patent
Singleton

(10) Patent No.: US 7,207,431 B1
(45) Date of Patent: Apr. 24, 2007

(54) CONVEYOR BELT DRIP PAN ASSEMBLY

(76) Inventor: Peter F. Singleton, 259 Main Entrance Dr., Pittsburgh, PA (US) 15228-2143

( * ) Notice: Subject to any disclaimer, the term of this patent is extended or adjusted under 35 U.S.C. 154(b) by 0 days.

(21) Appl. No.: 11/448,880

(22) Filed: Jun. 8, 2006

(51) Int. Cl.
  B65G 45/14 (2006.01)
(52) U.S. Cl. ..................... 198/498; 15/256.53
(58) Field of Classification Search ........ 198/493, 198/498, 735.1, 720, 735.4; 15/256.5, 256.53
  See application file for complete search history.

(56) References Cited

U.S. PATENT DOCUMENTS 3,913,728 A * 10/1975 Pott ........................... 198/498
4,189,046 A * 2/1980 Ward et al. ................ 15/256.5
4,200,185 A * 4/1980 Van Nocker et al. ....... 198/718
4,768,645 A * 9/1988 Farris ......................... 15/256.5
6,708,817 B2 * 3/2004 Klabisch et al. ............ 198/498

OTHER PUBLICATIONS

Baker Bohnert—Ram Mucker / Hydraulic Scavenger Conveyor.

* cited by examiner

Primary Examiner—James R Bidwell
(74) Attorney, Agent, or Firm—Paul Bogdon

(57) ABSTRACT

A conveyor belt drip pan assembly having a deck frame with a main surface section for receiving falling particles from a traveling conveyor belt. Elongated upright ramp members are secured to the sides of the deck frame. A scraper blade is reciprocally movable by a power source opposite the direction of travel of the conveyor belt and arranged to scrape particles off the main surface section of the deck frame. The scraper blade is moveable in the reverse direction elevated on the ramp members above the main surface section of the deck frame.

16 Claims, 10 Drawing Sheets

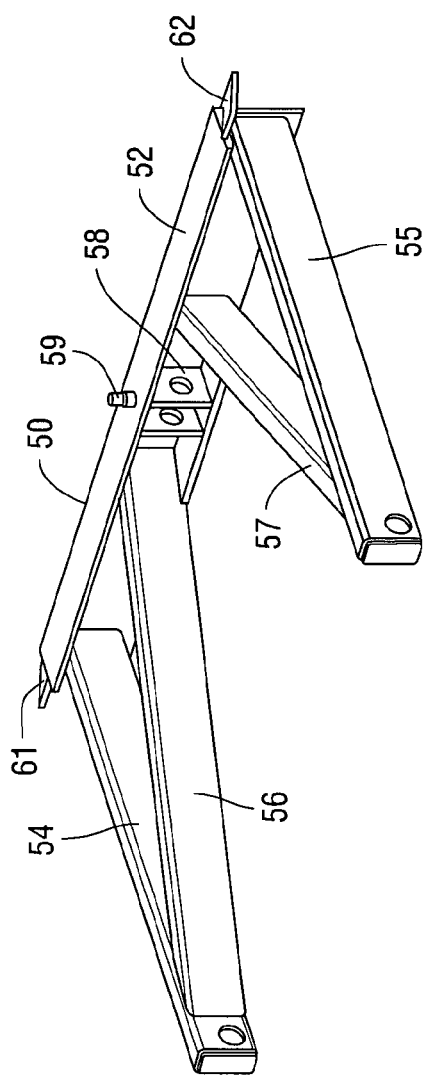
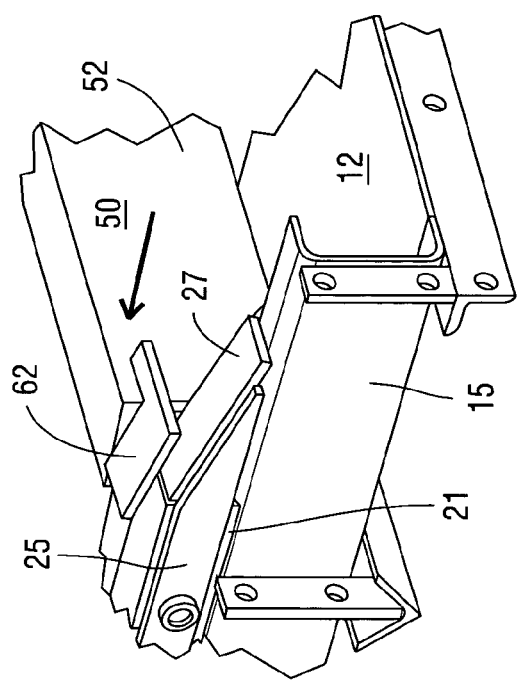
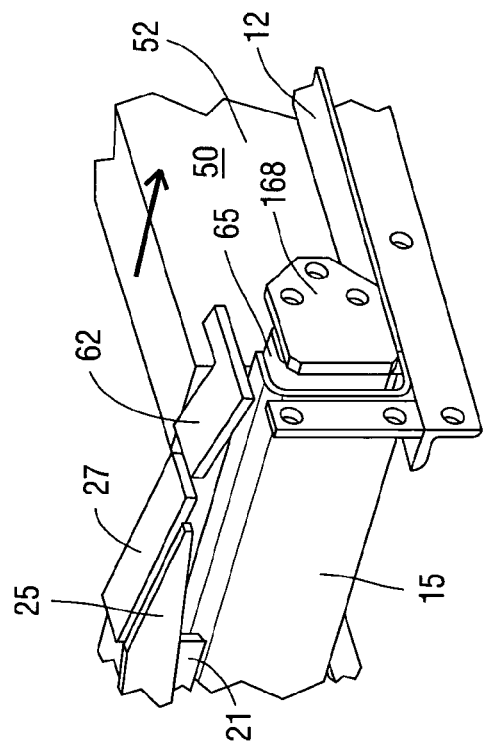

CONVEYOR BELT DRIP PAN ASSEMBLY

BACKGROUND OF THE INVENTION

1. Field of the Invention

This invention relates to a conveyor belt drip pan apparatus for receiving falling debris removed from the conveyor belt and transferring the debris to a receiving area.

2. Description of the Prior Art

Conveyor belts are widely used for transporting aggregate material such as coal, mineral ores, and other materials. Oftentimes some of the material will cling to the surface of the conveyor belt and be carried on the return run of the belt. The clinging material is referred to as carry back material or debris and must be removed from the belt to avoid possible damage or reduce the carrying capacity of the conveyor belt to convey the aggregate material thereby reducing operating efficiency. Various scraping methods and systems have been designed to scrape and remove the debris from the conveyor belt and onto another conveyor or the surface below the conveyor belt. Belt scraper devices are located on the unloaded strand or return run of the conveyor belt usually near the discharge point of the conveyor. The scraper device cleans the belt of the debris. If not cleaned, the debris may fall from the belt and if accumulated enough may interfere with the movement of the conveyor belt. Reference is made to U.S. Pat. Nos. 4,189,046 and 4,768,645, and the references cited therein which disclose known or proposed designs of conveyor belt scraper apparatus. Systems for receiving the scraped debris from a conveyor belt are known where the debris is received on a receiving belt or a drip pan or deck frame arranged below the conveyor belt and the debris transported from the receiving belt or deck frame onto a receiving or scavenger conveyor or bin. A drip pan system known in the art uses a scraping blade that is powered by a hydraulic ram to reciprocate on the drip pan to scrape off the debris. The scraping blade is retuned to a point and reciprocated again in the scraping direction. The reciprocating cycle is controlled automatically using proximity sensors to sense the need to reverse the scraping blade movement. The hydraulic ram scraping mechanism uses a scraping blade that relies solely on the bending strength of the actuating rod connection to the scraping blade. The rod connection is vulnerable to damage when the scraping blade is pushing a non-uniform load. Also, the known conveyor blade drip pan apparatus is limited in that the scraping blade travel is based on the maximum available length of the actuating cylinder rod stroke. In other words, the existing drip pan scraping system has no provision for extending the length of the drip pan arrangement and the length of scraping travel. The existing drip pan scraping system relies on a cam arrangement, exposed to the sometimes wet debris, to rotate the scraping blade to a position above the surface of the drip pan. The cam arrangement relies on friction of the drip pan surface to rotate the scraping blade. When friction is reduced due to moisture, for example, the scraping blade might not rotate and remain in engagement with the drip pan surface and debris will be dragged backwards on the return stroke of the scraping blade, clogging the drip pan, interfering with the effectiveness of removing the debris, or resulting in the debris being deposited on the surface area below the conveyor. It is not popularly used.

Another debris removing and transporting system uses a chain and flight arrangement to scrape and drag conveyor belt debris. The chain is driven on a powered sprocket with the flights scraping and transporting the debris to a removal area. The chain and flight scraping arrangement uses a significant number of moving parts is inefficient and unreliable.

The present invention overcomes the problems inherent in known conveyor belt drip pan apparatus by providing an apparatus which incorporates a scraper assembly having a scraper blade integrally stabilized to engage a drip pan or deck frame to scrape non-uniform loads and not rely solely on the bending strength of an actuating rod connection to the scraper blade. This invention also provides scraper blade movement on its return stroke which is positive, lifting the scraper blade above the deck frame surface without relying on friction forces required by cam rotating arrangement. This invention also allows scraper blade and deck frame extensions without need for modifying or changing the scraper blade movement power source. This invention applies a remotely located arrangement to control the movement cycle of the scraper blade avoiding exposure of sensing devises to debris environment. This invention overcomes this problem inherent in existing conveyor belt drip pan assemblies with few moving parts increasing its efficiency and reliability.

SUMMARY OF INVENTION

The present invention provides a conveyor drip pan assembly, which comprises, in its preferred form, a deck frame having a surface section sized and shaped to be positioned beneath a traveling conveyor belt for receiving falling particles from the conveyor belt, the deck frame having upwardly extending opposite side members; at least two elongated ramp members, one each arranged on each of the side members of the deck frame, and each having forward and rear end sections and a main body section with the upper portion of the main body section disposed above the upper surface of the side members of the deck frame; a scraper assembly reciprocally supported by the side members of the deck frame including a scraper blade extending across and engaging the surface section of the deck frame and having a power drive for reciprocally moving the scraper blade at least from adjacent the forward end section of the ramp members to adjacent the rear end section of the same ramp members and return. The deck frame, ramp members, and scraper assembly being constructed and arranged such that when the scraper member is reciprocated toward the rear end section of the ramp members the scraper blade will scrape and move any particles on the surface section of the deck frame and when the scraper assembly is reciprocated in its direction of the forward end section of the ramp members the scraper blade will move on the upper portion of this main body section of the ramp members and out of engagement with the surface section of the deck frame and be returned to adjacent the forward end section of the ramp members. The power drive could be a hydraulically operated and controlled piston and cylinder for reciprocally moving the scraper blade to and from the forward and rear end section of the ramp members. The rear sections of each of the side member of the ramp members are, preferably, movable upwardly and downwardly of the deck frame such as by being pivotably secured to the main body section of the ramp member, whereby the scraper blade will move on the rear, movable, pivotable section onto the upper portions of the main body portions of the ramp member when the scraper assembly is moved toward the forward sections of the ramp members. The conveyor drip pan assembly of the invention may also, as desired, be extended by including a second deck frame of the same form as the first deck frame, secured to the first deck frame with the surface sections and the side member of the deck frame forming a continuous and generally coplanar assembly. Also, a second scraper blade assembly could be secured to the first scraper blade assembly, together reciprocated by the singular power drive.

The basic structure of the apparatus of the invention is simple in construction, uncomplicated, and effective and reliable in its use. It is positive in its operation not depending on the friction characteristic of its surroundings in its functioning. It does not rely solely on the bending strength of any connection of the power drive with the scraper blade with the power drive being controlled through elements located remotely from the wet debris laden environment. Basic structures of this invention may as desired, be coupled to extend the conveyor belt drip pan assembly.

Various other advantages, details, and modifications of the present invention will become apparent and indicated as the following description of certain preferred embodiments of the invention proceed.

BRIEF DESCRIPTION OF THE DRAWINGS

In the accompanying drawings we show certain present preferred embodiment of the invention in which:

FIG. 5 is a perspective view of an unattached scraping blade assembly forming part of the assembly of FIG. 1 showing details of construction;

FIGS. 6A and 6B are enlarged perspective views of one side of the scraper blade of the assembly of FIG. 1 illustrating the movement of the scraping blade off of a side section of the drip frame and moving onto the upper section of the ramp member, respectively;

DESCRIPTION OF A PREFERRED EMBODIMENT AND EXTENSION THEREOF

Figure 1:
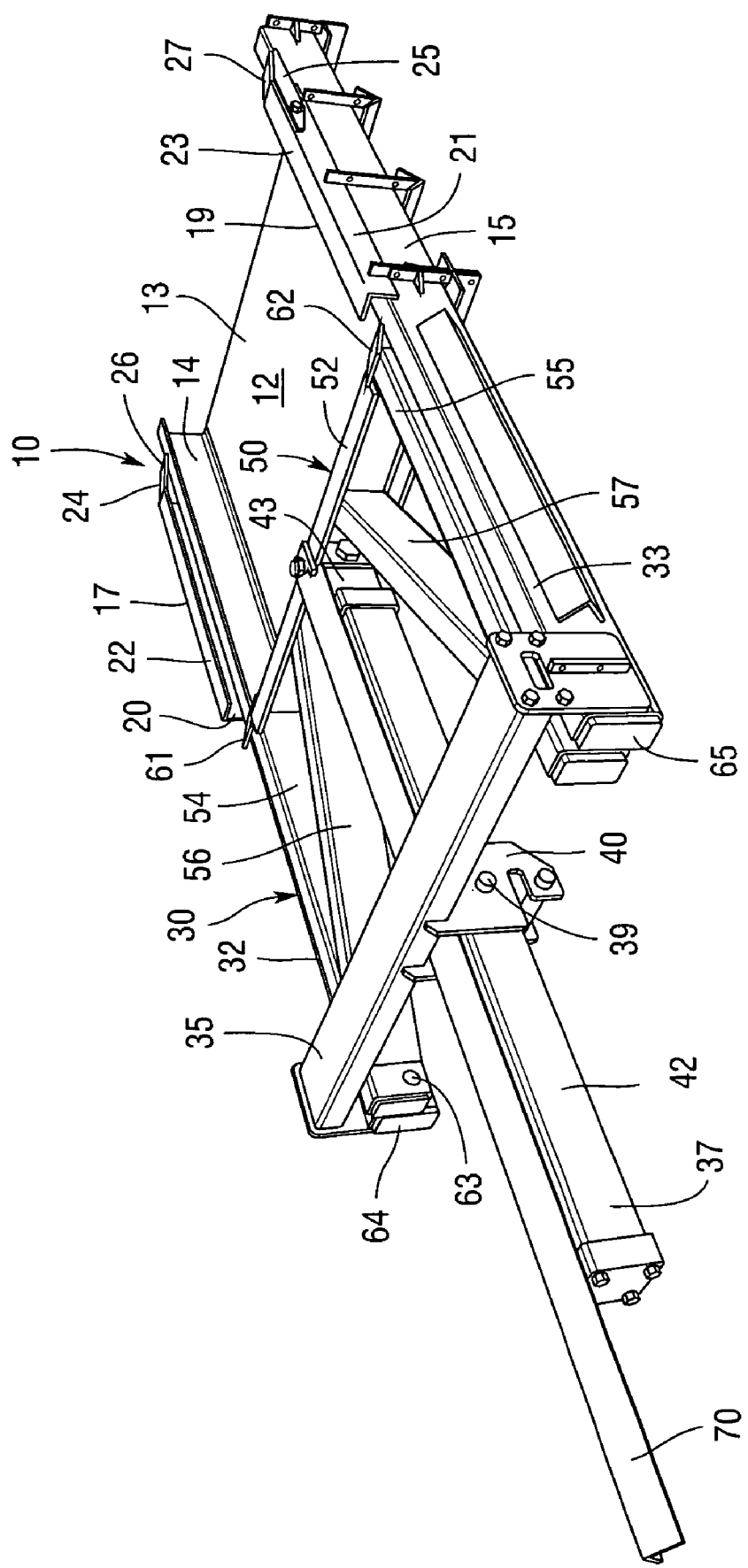
FIG. 1 is a perspective view of a conveyor belt drip pan assembly of the present invention.
Figure 2:
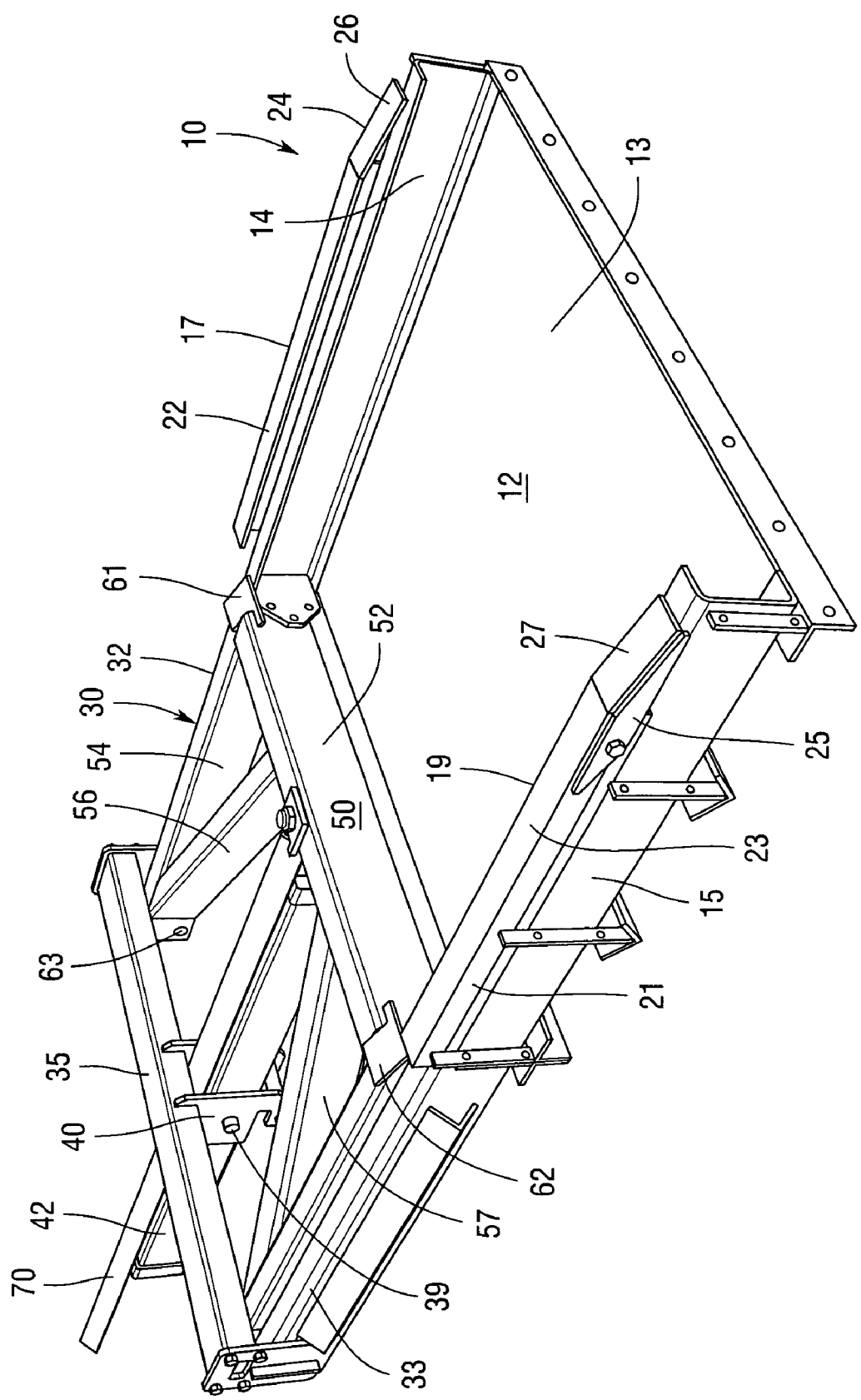
FIG. 2 is a perspective view of the conveyor belt drip pan assembly of FIG. 1 looking from the rear end of the assembly to show details of construction.

Referring now to the drawings, FIGS. 1–4 show a conveyor belt drip pan assembly 10 for receiving and transporting what is known in the art as carry back material or debris scraped from the return run of a conveyor belt. The drip pan assembly 10 include a main deck frame 12 sized and shaped to be positioned beneath a traveling conveyor belt for receiving debris scraped from the belt. The main deck frame 12 is generally U-shaped having a main surface section 13 and upwardly extending opposite channel-like side members 14 and 15 having generally flat upper sections secured to the side members 14 and 15 are similarly shaped elongated ramp members 17 and 19 having generally L-shaped main body sections 20 and 21, respectively and flat upper portions 22 and 23 each being in planes generally parallel to the flat upper sections of side members 14 and 15. Latching ramps 24 and 25 are pivotably recurred by suitable means to the respective rear end sections of the main body sections 20 and 21 of the ramp members 14 and 15. As shown, the latching ramps 24 and 25 are similarly shaped having rearward inclined end sections 26 and 27 with the rearward tips thereof normally in engagement with the upper sections of the side members 14 and 15. The functioning of the latching ramps 24 and 25 will be more fully described hereinafter. As shown in the various views of the drawings suitable strengthening members are secured to the main deck frame 12 with different strengthening members being provided to resist bending of the deck frame 12 where differing loads would be placed on the deck frame 12.

Figure 3:
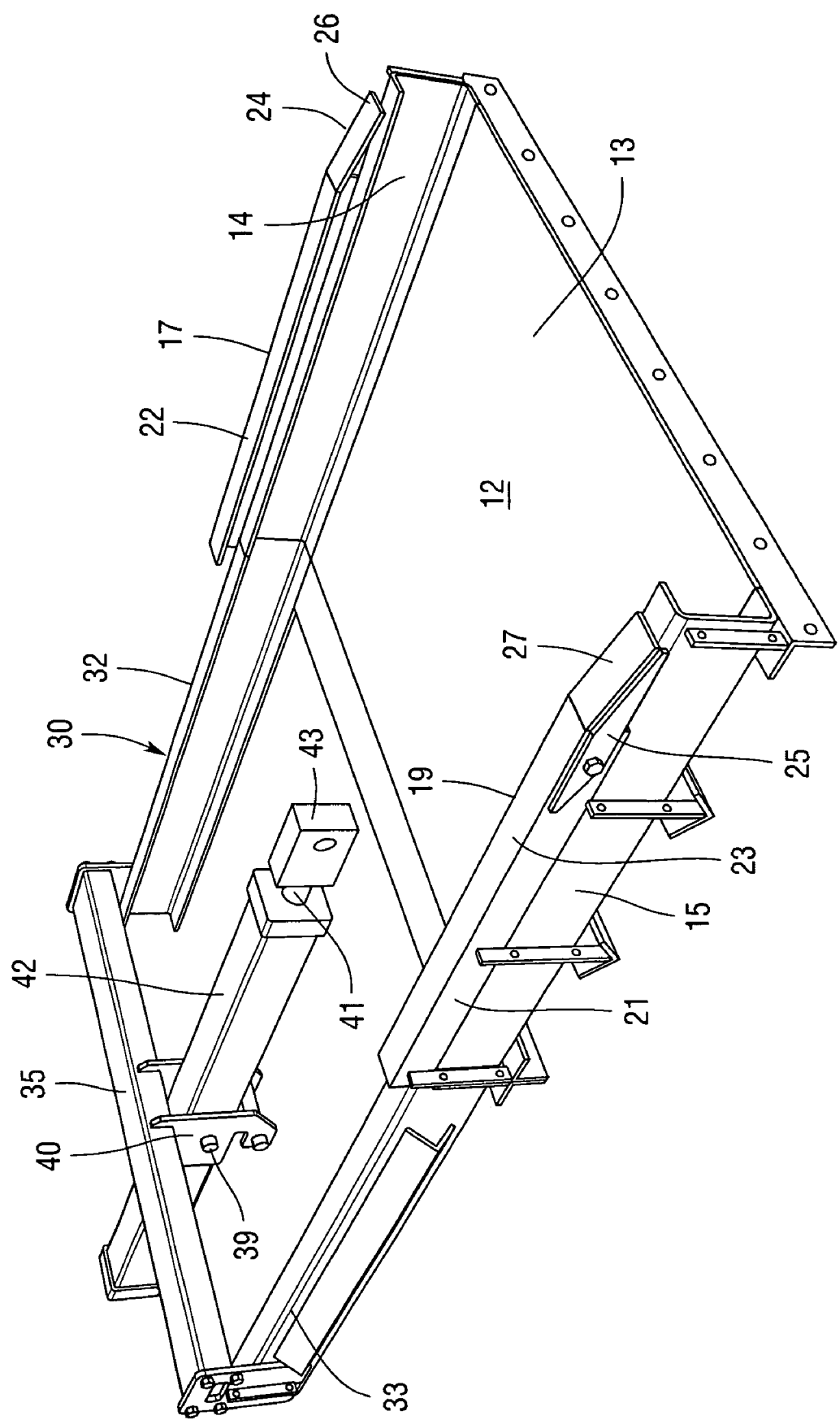
FIGS. 3 and 4 are perspective views of the assembly of FIG. 1 with certain elements thereof removed to show details of construction.
Figure 4:
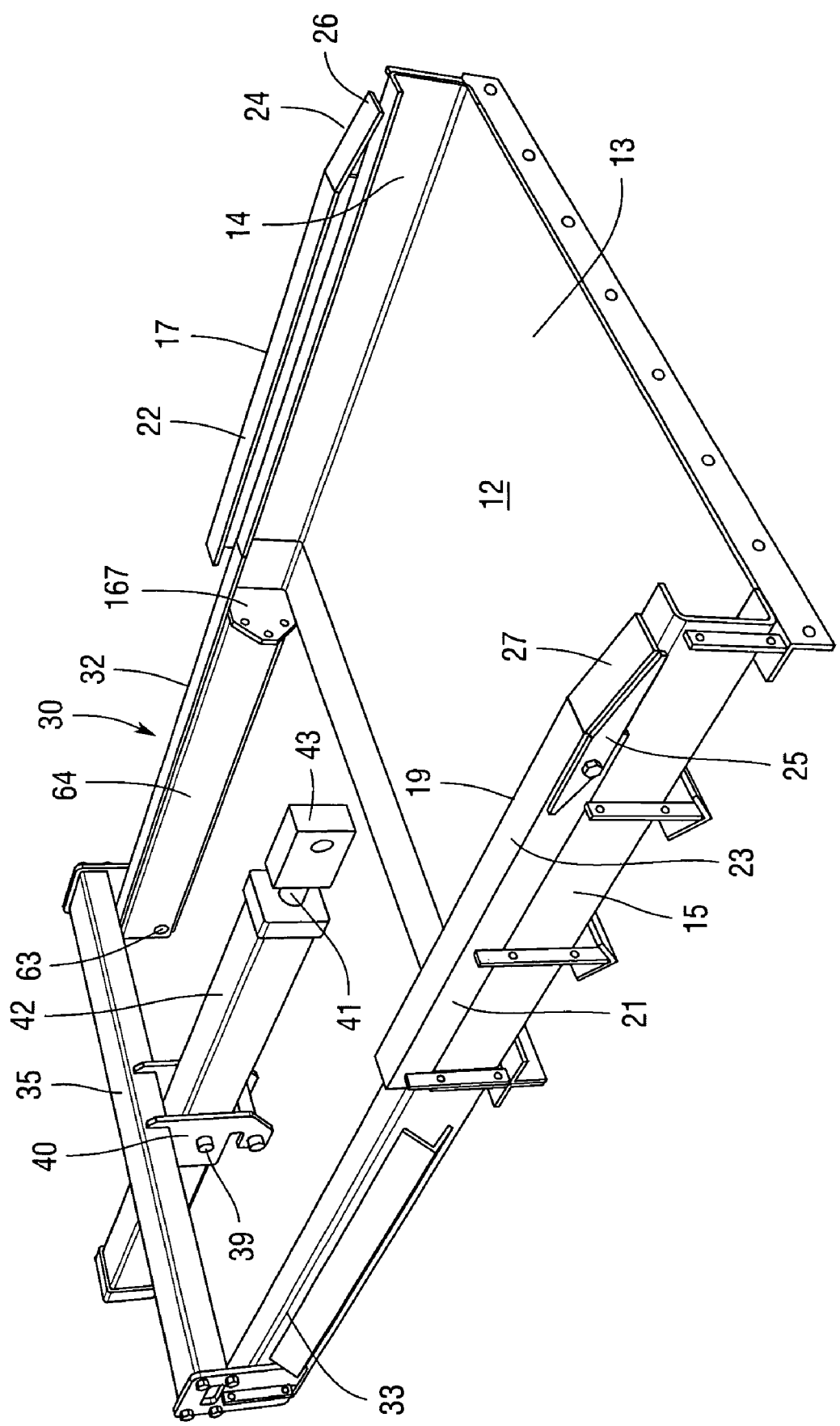

As clearly shown in FIG. 3, a cylinder mount frame 30 is secured to the main deck frame 12 and includes channel-like arms 32 and 33 suitably secured at their rear ends and forming extensions of the side members 14 and 15. A cross member 35 is fixed to the forward end portions of the arms 32 and 33. A power drive means in the form of an actuating hydraulic cylinder assembly 37 of any well-known construction is pivotably secured by a pivot pin 39 to a yoke 40 fixed to a mid section of the cross member 35. The hydraulic cylinder assembly 37 includes a typical slidable rod 41, as clearly shown in FIGS. 3 and 4, within a cylinder 42. A rod connector 43 is fixed to the free end of the rod 41.

A main scraper assembly 50 is arranged to be reciprocally moved under the urgings of the hydraulic cylinder assembly 37 from the front end of the main deck frame 12 to adjacent the rear end of the ram main frame 12. The main scraper assembly 50 includes a push blade or scraper blade 52 sized to extend across the width of the main surface section 13 of the main deck frame 12. The scraper blade 52 is shaped and sized so that its lower end engages in scraping relationship the surface of the main surface section 13 of the main deck frame 12. As clearly shown in FIG. 5, elongated stabilizing arms 54 and 55 are suitably secured at their rear end section to the side sections of the back of the scraper blade 52. Brace members 56 and 57 are suitably secured between the back of the scraper blade 52 and the forward sections of the stabilizing arms 54 and 55. A yoke-like mount 58 is fixed to a mid section of the back of the scraper blade 52 and a mounting finger 59 for securing a cylinder protector is fixed to a mid upper section of the same scraper blade 12. Downwardly lifting wings 61 and 62 are fixed to the opposite upper end sections of the scraper blade 52. The forward end sections of the stabilizing arms 54 and 55 are suitably pivotally secured by pivot pins 63 (as shown) to elongated blade transfer arms 64 and 65 arranged in the confines of the arms 32 and 33 which are co-extensive with side members 14 and 15 of the main deck frame 12. The main scraper assembly 52 is arranged to move, that is reciprocate, guided within the confines of the arms 32 and 33, and side members 14 and 15 with the bottom of the scraper blade 52 in scraping engagement with the main surface section 13 of the main deck frame 12.

The rod 41 of the hydraulic cylinder assembly is suitably secured to the scraper blade 52 by the rod connector 43 in engagement with the mount 58. An elongated double pitched cylinder protector cover 70 is fixed at its end sections to the scraper blade 52 at the mounting finger 59. The protector cover 70 moves with the scraper blade 52 covering the cylinder 42 and protecting it and the entire hydraulic cylinder assembly 37 from any falling debris.

The hydraulic cylinder assembly 37 when operational will initially urge the scraper blade assembly 50 under the pressure applied to the cylinder rod 41 in the direction of the rear end of the main deck frame 12. The lifting wings 61 and 62 will ride beneath the upper portions 22 and 23 of the ramp members 17 and 19 and on the upper surfaces of side members 14 and 15. As shown in FIGS. 6A and 6B, when the scraper blade 52 reaches the latching ramps 24 and 25 the inclined lifting wings 61 and 62 will urge the latching ramps 24 and 25 to pivot upwardly to allow the lifting wings 61 and 62 and the scraper blade 52 to move ahead of the ramp members 17 and 19 at which point the latching ramps 24 and 25 pivot downwardly to their original or normal positions, piston rod 41 of the hydraulic cylinder assembly 37 will reverse its direction of travel and will pull the main scraper blade assembly 50 in the direction of the forward end of the main deck frame 12. With the scraper blade 52 moving in the reverse direction the lifting wings 61 and 62 will ride on the inclined surface of the latching ramps 24 and 25 with the scraper blade assembly 50 and the hydraulic cylinder assembly 37 pivoting on the pivot pins 39 and pivot pins 63 on the pivot and the lifting wings 61 and 62 continuing traveling in engagement with the upper portions 22 and 23 of the ramp members 17 and 19. The scraper blade 52 travels to the forward end of the ramp members 17 and 19 where the lifting wings 61 and 62 disengage from the ramp members 17 and 19 and the main scraper assembly 50 and hydraulic cylinder assembly 37 pivoting to their starting positions with the scraper blade 52 at the forward end and in engagement with the surface section 13 of main deck frame 12. The reciprocal movement cycle is repeated automatically.

Figure 10A:
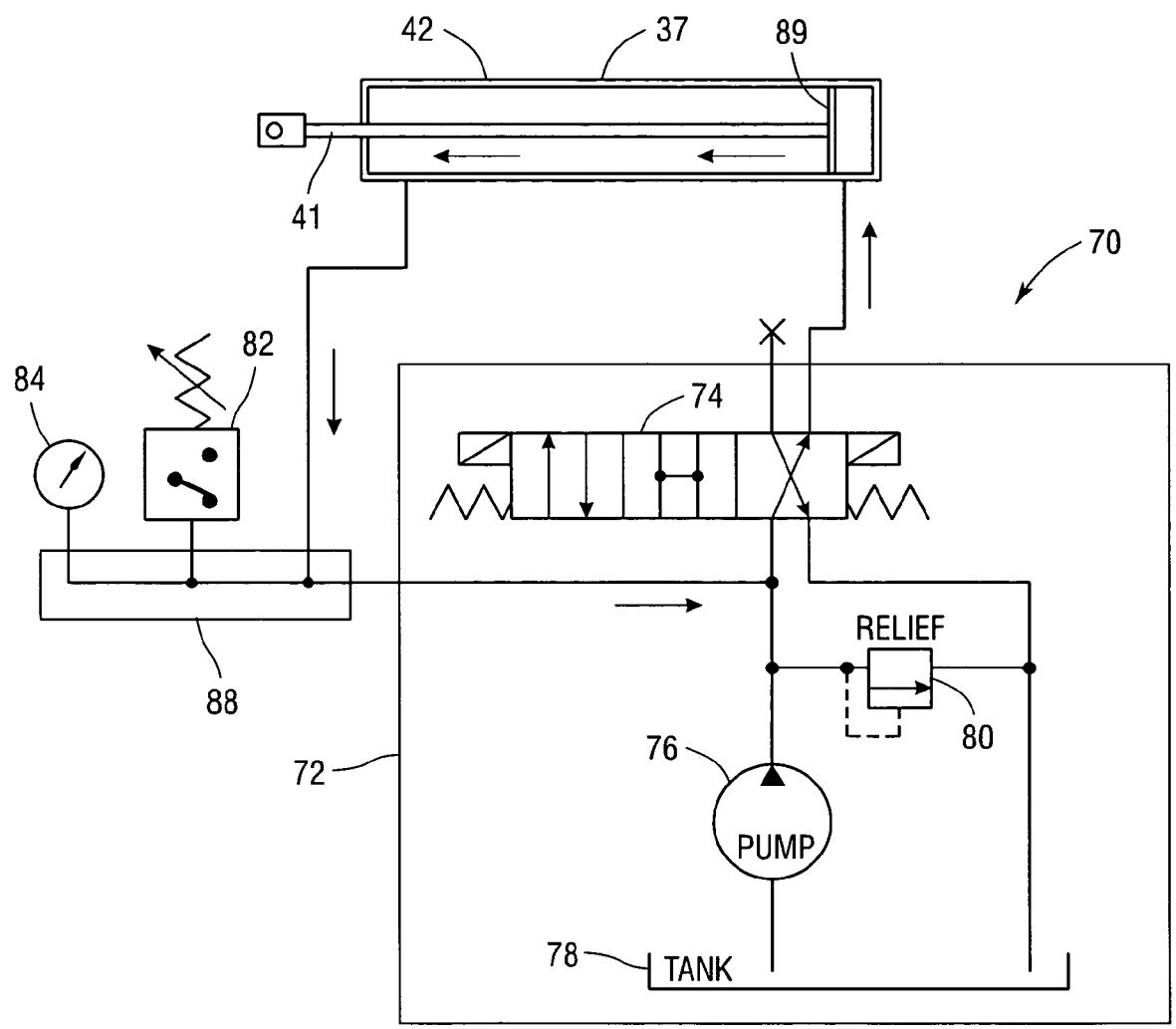
FIGS. 10A and 10B are schematic and diagrammatic views of a hydraulic circuitry illustrating the control of the flows of hydraulic fluid in the extending and retracting modes of the piston rod of the hydraulic cylinder assembly.
Figure 10B:
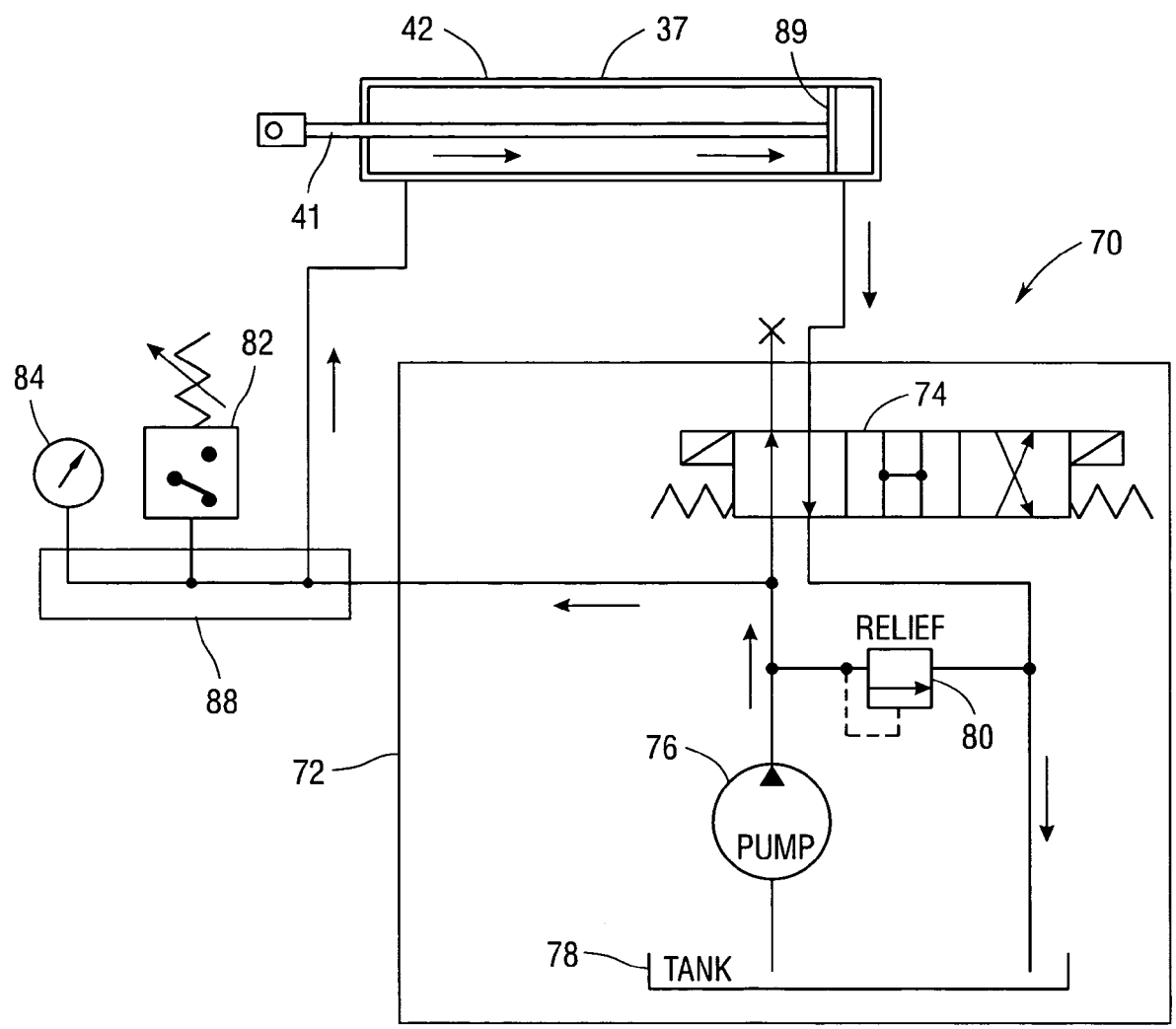

FIGS. 10A and 10B show schematically a hydraulic control circuit 70 for operating the hydraulic cylinder assembly 37 to reciprocate the scraper blade assembly through the above described cycle. The circuit 70 in its operation and elements is standard and includes a power source 72 having interconnected shifting valve 74 of well-known design, pump 76, hydraulic fluid containing tank 78, and pressure relief valve 80. Also included, interconnected with the elements of the power source 72, are a pressure sensing switch 82 and pressure gauge 86 in and on a pressure manifold 88. As shown in FIGS. 10A and 10B the hydraulic circuitry 70 is operatively connected with the rear and forward ends of the piston 89 within the cylinder 42, the piston 89 connected at its forward end to the piston rod 41. As shown in FIG. 10A the flow of hydraulic fluid is to the rear end of the piston 89 to urge the piston 89 and rod 41 outwardly of the cylinder 42 and moving the scraper blade assembly 50 toward the rear end of the deck frame 12, as earlier described. When the rod 41 is fully extended or when the scraper blade 52 and lifting wings 61 and 62 are in their fully extended positions, as described, the rod 41 is fully extended at which point the pressure within the cylinder 37 rises, the pressure sensing switch 52 trips and the shifting valve 74 shifts its position to reverse the flow of hydraulic fluid as illustrated in FIG. 10B. The piston 89 and rod 41 reverse direction urging the blade assembly 50 to its starting position, as described.

Figure 7:
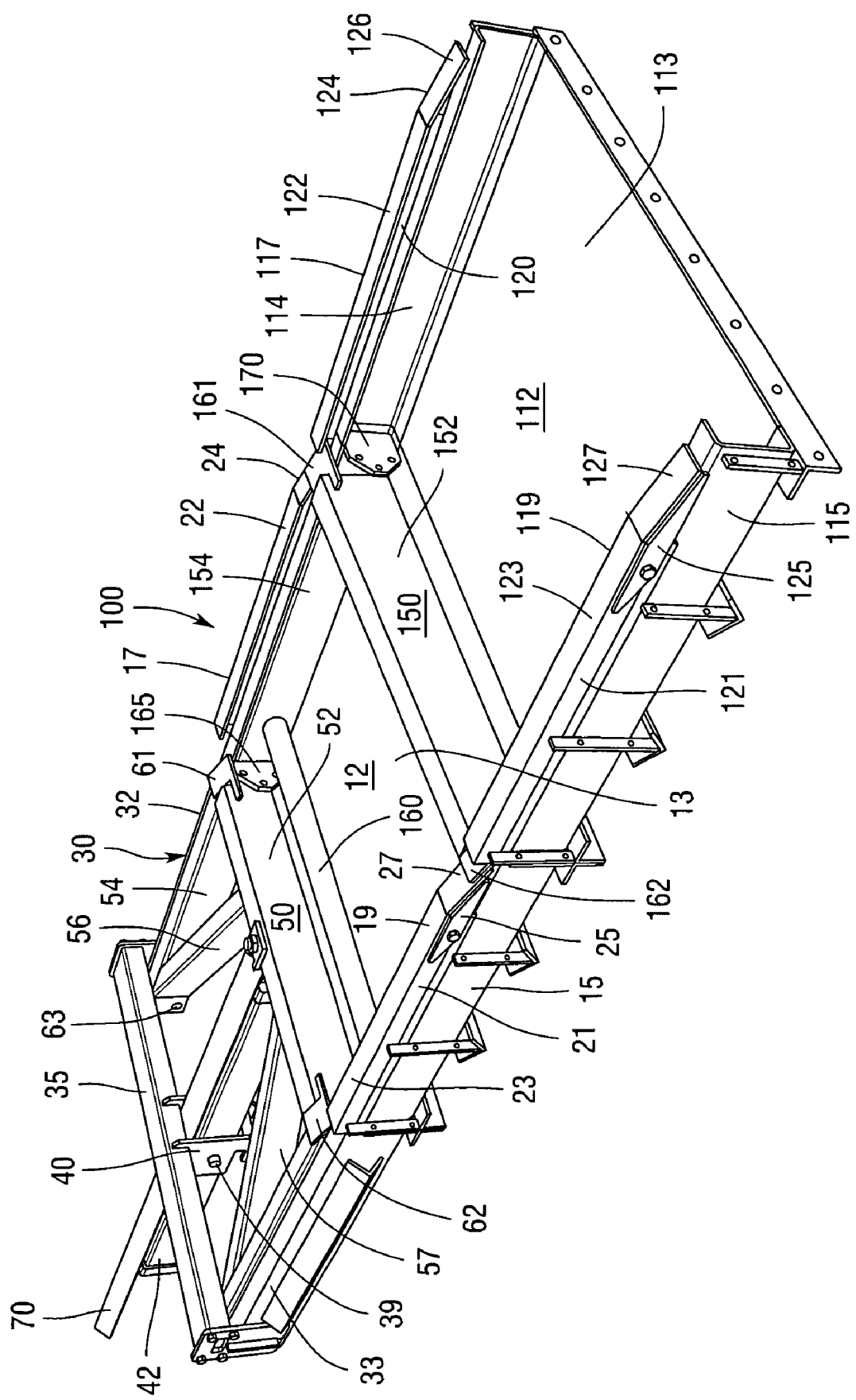
FIG. 7 is a perspective view of a compound conveyor belt drip assembly showing a second deck frame secured to the main deck frame of the assembly of FIG. 1 and a second scraping blade secured to the main scraping blade of the same assembly.

As shown in FIG. 7, extensions may be proved to lengthen the surface area for receiving falling debris and to add one or more scraping blades. To provide a compound conveyor drip pan assembly 100 a second deck frame 112 having essentially the same form and elements as main deck frame 12 is suitably secured to the rear end section of the main deck frame. The second deck frame 112 has side members 114 and 115 and a surface section 113 essentially the same as those elements of main deck frame 12. The side members 114 and 115 and surface section 113 coextend with and are coplanar with side members 14 and 15 and main surface section 13, respectively, of main deck frame 12. The second deck frame 112 is provided with elongated ramp members 117 and 119 essentially identical in size and shape with ramp members 17 and 19 of main deck frame 12. As with ramp members 17 and 19, ramp members 117 and 119 are generally L-shaped having main body sections 120 and 121 with flat upper portions 122 and 123 in planes generally parallel to the flat upper section of the side members 114 and 115. Latching ramps 124 and 125 are pivotably secured to the respective end sections of the main body sections 120 and 121 of the ramp members 114 and 115. The upper portion 122 and 123 are coplanar with the upper sections 22 and 23 of the ramp members 17 and 19.

Figure 8:
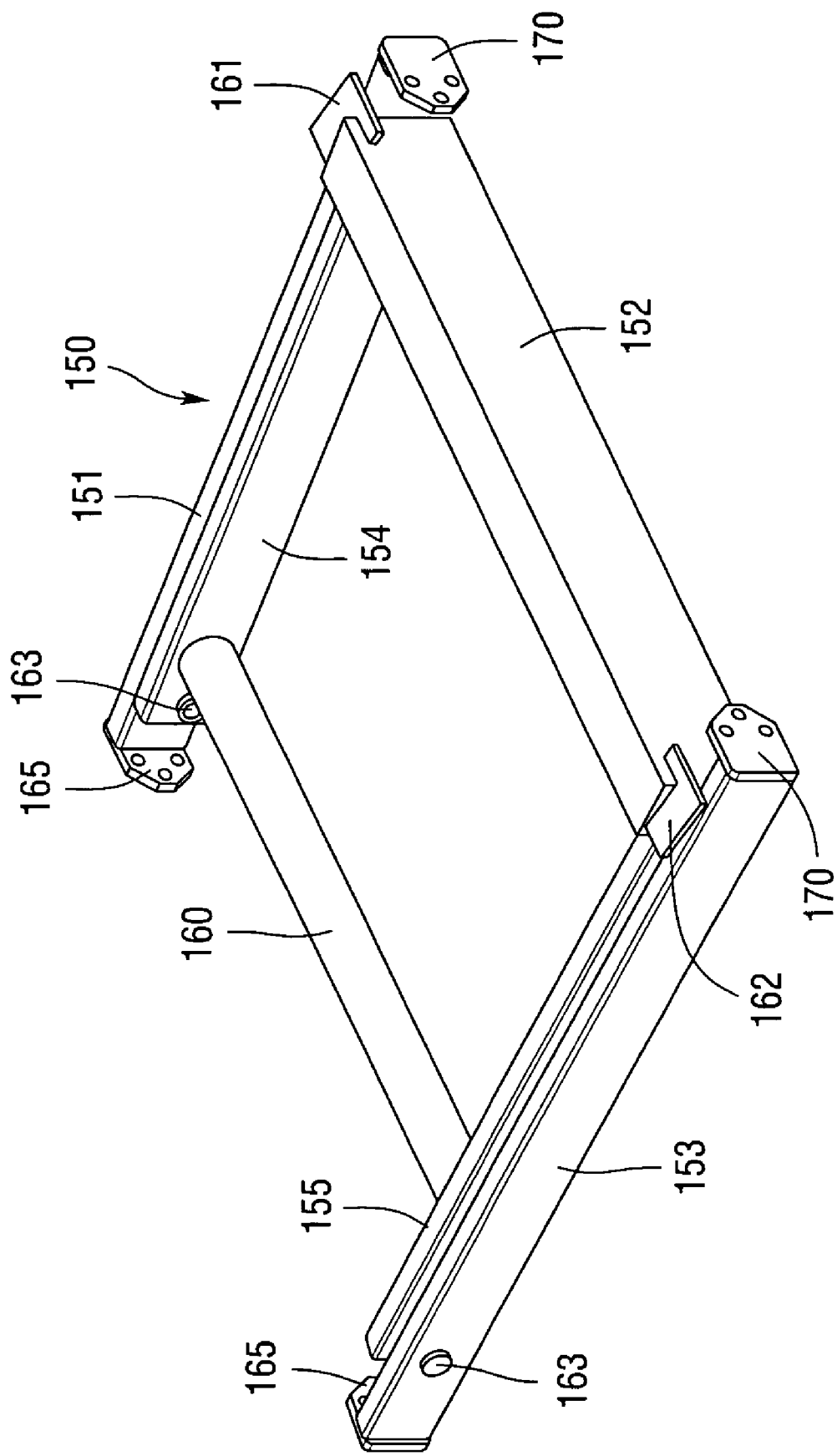
FIG. 8 is a perspective view of an unattached scraping blade assembly forming part of the assembly of FIG. 7 showing details of construction.
Figure 9:
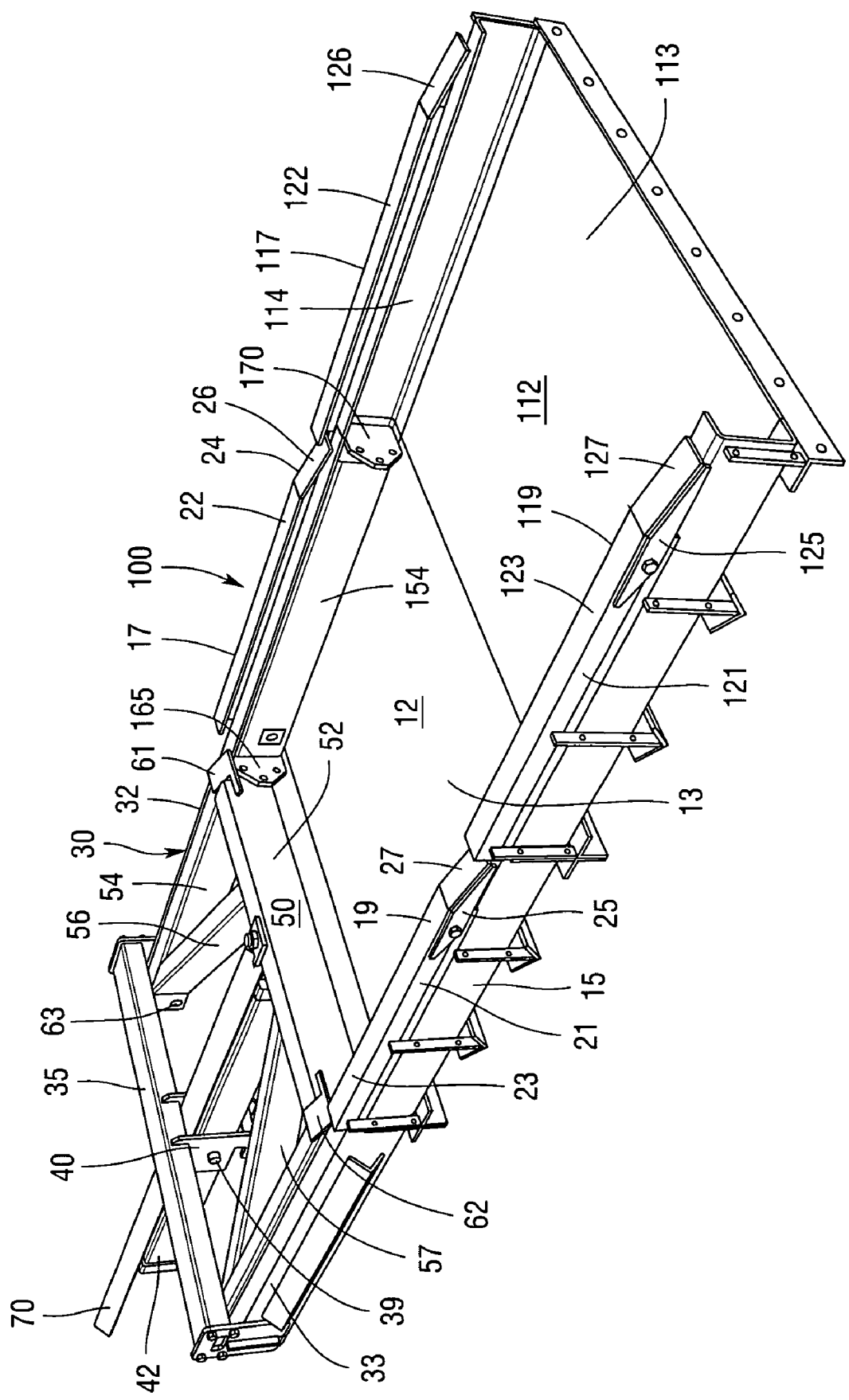
FIG. 9 is a perspective view of the assembly of FIG. 7 with certain elements removed to show details of construction.

As shown, the compound conveyor drip pan assembly 100 is provided with a second scraper blade assembly 150 somewhat simpler in construction than the main scraper blade assembly 50. Scraper blade assembly 150 depends on its reciprocating movement on the hydraulic cylinder assembly 37 of the main scraper blade assembly 30. As clearly shown in FIG. 8, the second scraper blade assembly 150 is provided with a pair of transfer arms 151 and 153 slidably received in the side members 14 and 15, respectively, and arranged to also slide in side members 114 and 115 when the scraper blade assembly 150 is moved. The second scraper blade assembly 150 has a scraper blade 152 sized to extend across the width of the surface section 113 of the second deck frame 112. As with scraper blade 52, scraper blade 152 is shaped and sized so that its lower end engages in scraping relationship the surface of the surface section 113 of the deck frame 112. As clearly shown in FIG. 8, elongated stabilizing arms 154 and 155 are suitably secured at their rear ends to the back of scraper blade 152. Brace member 160 is secured between the stabilizing arms 154 and 155 which are suitably pivotally secured by pivot pins 163. Downwardly inclined lifting wings 161 and 162 are fixed to opposite upper sections of the scraper blade 152. The transfer arms 151 and 153 are suitably secured at their respective forward ends to rearward ends of transfer arms 52 and 53 of the main scraper assembly 50. The respective transfer arms 151 and 153 are each provided with a transfer bar 165 shaped to engage and be secured to similar transfer bars 168, one of which is clearly shown on FIG. 6A, fixed to the ends of transfer arms 52 and 53 of the main scraper assembly 50.

With the second scraper blade assembly 150 secured to the main scraper assembly 50, the hydraulic cylinder assembly 37 when activated will urge both scraper assemblies in the rearward direction of the main and second deck frames 12 and 112. In the operating cycle, the main scraper assembly 50 and the second scraper assembly 150 will be pulled toward the forward ends of the deck frames 12 and 112 with the scraper blades 52 and 152 being elevated above the surface sections 13 and 113 of the deck frames 12 and 112. The lifting wings 61, 62, 161, and 162 interact with the latching ramps 24, 25, 124, and 125 and ramp members 17 and 19 in the manner described with respect to the main scraper blade assembly 50. Thus, the lifting wings 161 and 162 will ride on the upper sections of the side members 114 and 115 and below the upper portions 122 and 123 of the ramp members 117 and 119. When the scraper blade 152 reaches the latching ramp 124 and 125 the inclined lifting wings 161 and 162 will urge the latching ramp 124 and 125 to pivot upwardly to allow the lifting wings 161 and 162 and the scraper blade 152 to move ahead of the ramp members 117 and 119 at which point the piston rod 41 of the hydraulic cylinder assembly 37 will reverse its direction of travel and will pull both the main scraper blade assembly 50 and second scraper blade assembly 150 in the direction of the forward sends of the main deck frame 12 and second deck frame 112. With the main scraper blade 52 and second scraper blade 152 moving in the reverse direction the lifting wings 61, 62, 161, and 162 will ride on the respective inclined surfaces of the latching ramps 24, 25, 124, and 125 with the main scraper blade assembly 37 pivoting on the pivot pin 39 and pivot pins 63 and the second scraper blade assembly 150 pivoting on the pivot pins 163, with the lifting wings 61, 62, 161, and 162 continuing traveling in engagement with the respective upper portions 22, 23, 122, and 123 of ramp members 17, 19, 117, and 119, respectively. The scraper blades 52 and 152 travel to the forward ends of the ramp members 17, 19, 117, and 119, respectively where the lifting wings 61, 62, 161, and 162 disengage from the ramp members 17, 19, 117, and 119, respectively, and the main scraper blade assembly 50 and second scraper assembly 150 pivot to their starting positions with the scraper blades 52 and 152 at the forward ends and in engagement with the main deck frame 12 and second deck frame 112, respectively. The reciprocal movement cycle is repeated automatically.

Transfer bars 170 are fixed to the respective rear ends of the transfer arms 156 and 157 for use in securing thereto yet another scraper blade assembly, as desired.

The conveyor belt drip pan assembly 10 and the compound drip pan assembly 100 are typically arranged beneath the return run of a conveyor belt. Any standard and well known conveyor belt scraping system would be arranged to scrape debris from the return run of the conveyor belt. The debris would fall onto the surface sections 13 and 113 of the deck frames 12 and 112 and under the urging of the hydraulic cylinder assembly 37, the scraper blades 52 and 152 would scrape the debris from the surface sections 13 and 113 and off the rear edge of the surface section 113 of the second deck frame 112 onto a receiving area such as a scavenger conveyor, bin, or the floor beneath the traveling conveyor.

Various modifications may be made to the structure of the conveyor belt drip pan assembly of the invention as clearly understood by those skilled in the art. One such modification would be the widening of the deck frame and scraper blade to serve wider conveyor belts with the wider deck frame and scraper blade being provided with suitable support members to prevent bending. Another modification would be in the power drive which could be a suitable motor driven gear system. The deck frame and scraper assemblies of compound drip pan assemblies could readily be interconnected by means other than those illustrated and described.

It should now be clearly understood and apparent that the conveyor belt deck pan assembly of this invention is effectively and efficiently useable in receiving and transferring debris scraped from a traveling conveyor belt, overcoming the drawbacks of existing deck pan systems noted in the introductory section of the specification.

While I have shown and described a present preferred embodiment of this invention and an extension thereof, it is to be distinctly understood this invention is not limited thereto, but may be otherwise embodied within the scope of the following claims.

I claim:

1. A conveyor belt drip pan assembly, comprising:
    a main deck frame means having a surface section sized and shaped to be positioned beneath a traveling conveyor belt and having upwardly extending opposite side members, for receiving falling particles from the traveling conveyor belt;
    at least two elongated ramp members, one each arranged on each of said side members and each having forward and rear end sections and a main body section with the upper portions of the main body section disposed above the upper surface of said side members of said deck frame means;
    a scraper assembly reciprocally supported by said side members including a scraper blade extending across and engaging said surface section of said deck frame means and having a power drive means for reciprocally moving said scraper blade at least from adjacent the forward end section of said ramp members to adjacent the rear end of said ramp members and return; and
    said deck frame means, ramp members, and scraper assembly being constructed and arranged such that when said scraper assembly is reciprocated toward the rear end sections of said ramp members said scraper blade will scrape and move any particles on said surface section of said deck frame means and when said scraper assembly is reciprocated in the direction of said forward end sections of said ramp members said scraper blade will move on said upper portions of said main body sections of said ramp members out of engagement with said surface section of said first deck frame means and be returned to adjacent said forward end section of said ramp members.

2. A conveyor belt drip pan assembly, as set forth in claim 1 wherein said power driver means of said scraper assembly includes a hydraulically operated and controlled piston and cylinder drive means for reciprocally moving said scrape blade to and from said forward end sections and rear end sections of said ramp members; and including control means disposed remotely from the elements of said assembly for controlling the reciprocal movement of said power means.

3. A conveyor belt drip pan assembly, as set forth in claim 1 wherein each of said rear sections of each of said side members of said ramp members is movable upwardly and downwardly of said side members of said deck frame means whereby said scraper blade moves on said rear sections onto said upper portions of said main body portions of said ramp members when said scraper assembly is moved toward said forward sections of said ramp members.

4. A conveyor belt drip pan assembly as set forth in claim 1 wherein each of said side members of said deck frame has a generally flat upper portion; and wherein each of said main body sections of said ramp members has an upper generally flat section disposed above and generally parallel to said upper portion of said deck frame.

5. A conveyor belt drip pan assembly as set forth in claim 1 including a pair of wing members, one each secured at upper portions of opposite upper end sections of said scraper blade and constructed and arranged to slidably engage each upper surface of said side members of said deck frame as said scraper assembly is moved toward said rear end sections of said ramp members and to slidably engage the upper surface of said ramp members when said scraper assembly is moved toward said forward end sections of said ramp members.

6. A conveyor belt drip pan assembly as set forth in claim 3 wherein each of said forward sections of each of said side members is pivotably secured to said main body section of each of said ramp members.

7. A conveyor belt drip pan assembly as set forth in claim 1 including a second deck frame means secured to said first deck frame means and having a second surface section and second surface section and second upwardly extending opposite side members constructed and arranged to form a continuous and generally coplanar assembly with said first deck frame means.

8. A conveyor belt drip pan assembly as set forth in claim 1 including protective covering means for at least partially surrounding and protecting said power means of said scraper assembly.

9. A conveyor belt drip pan assembly as set forth on claim 7 wherein said scraper assembly includes connection means for securing a second scraper blade to said scraper blade of said scraper assembly.

10. A conveyor belt drip pan assembly as set forth in claim 9 including a second scraper blade secured to said scraper assembly.

11. A conveyor belt drip pan assembly, comprising:
deck frame means including a main surface section for receiving falling particles from a traveling conveyor belt;
elongated ramp members on said frame means elongated said main surface section;
scraper blade means reciprocally moveably supported scarping particles off said main surface section of said deck frame means;
power means for reciprocating said scraper means to and from predetermined opposite points of said ramp members;
said ramp members having upper sections disposed above said deck frame means;
said deck frame means, ramp means, scraper blade means and power means being constructed and arranged such that when said scraper blade means is reciprocated in one direction said scraper blade well engage said main surface section of said deck frame means and when said scraper blade means is reciprocated in an opposite direction of said one direction said scraper blade means will be disposed above said main section of said deck frame means.

12. A conveyor belt drip pan assembly as set forth in claim 11 wherein said ramp members includes upright side members; and said ramp members are secured to said upright side members.

13. A conveyor belt drip pan assembly as set forth in claim 11 wherein said ramp members include upwardly and downwardly moving rear sections constructed and arranged to be engaged by said scraper blade means to guide said scraper blade means to a position above said main section of said deck frame means when said scraper blade means is reciprocated in said opposite direction.

14. A conveyor belt drip pan assembly as set forth in claim 11 wherein said assembly comprises a series of similarly formed deck frame means and ramp means tandemly, coplanarly, continuously arranged, and a series of connected scraper blade means.

15. A conveyor belt drip pan assembly as set forth in claim 11 including protective covering means for at least partially surrounding and protecting said power means from any particles falling from a conveyor belt.

16. A conveyor belt drip pan assembly as set forth in claim 11 including control means disposed remotely from the elements comprising said assembly for controlling the reciprocating of said power means.

* * * * *